(12) United States Patent
Easton

(10) Patent No.: US 12,037,991 B2
(45) Date of Patent: Jul. 16, 2024

(54) METHOD AND APPARATUS FOR CONTROLLING POWER DELIVERED TO AN SMA ACTUATOR

(71) Applicant: CAMBRIDGE MECHATRONICS LIMITED, Cambridge (GB)

(72) Inventor: Mark George Easton, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 303 days.

(21) Appl. No.: 17/299,048

(22) PCT Filed: Dec. 5, 2019

(86) PCT No.: PCT/EP2019/083918
§ 371 (c)(1),
(2) Date: Jun. 2, 2021

(87) PCT Pub. No.: WO2020/115260
PCT Pub. Date: Jun. 11, 2020

(65) Prior Publication Data
US 2022/0106941 A1  Apr. 7, 2022

(30) Foreign Application Priority Data

Dec. 5, 2018 (GB) .................................. 1819864

(51) Int. Cl.
*G02B 6/35* (2006.01)
*F03G 7/06* (2006.01)
*G02B 6/38* (2006.01)

(52) U.S. Cl.
CPC .......... *F03G 7/06143* (2021.08); *F03G 7/066* (2021.08); *G02B 6/3584* (2013.01); *G02B 6/3859* (2013.01); *G03B 2205/0076* (2013.01)

(58) Field of Classification Search
CPC ... F03G 7/066; F03G 7/06143; G02B 6/3584; G02B 6/3859; G03B 2205/0076
See application file for complete search history.

(56) References Cited

U.S. PATENT DOCUMENTS 4,930,494 A * 6/1990 Takehana ............. A61B 1/0058
600/145
11,595,864 B1 * 2/2023 Marupaduga ......... H04W 76/15
(Continued)

FOREIGN PATENT DOCUMENTS

WO  WO 2019073212  4/2019

OTHER PUBLICATIONS

GB Search Report dated May 21, 2019 of GB Application 1819864.8.
International Search Report and Written Opinion of PCT/EP2019/083918 dated Feb. 17, 2020.

*Primary Examiner* — Shafiq Mian
(74) *Attorney, Agent, or Firm* — Haley Guiliano LLP

(57) ABSTRACT

A method of controlling power delivered to a shape memory alloy, SMA, actuator wire arrangement, wherein the arrangement comprises a plurality of SMA actuator wires, comprising: the steps of: applying, at a PWM frequency, to each of the SMA actuator wires during respective active periods a succession of voltage pulses; and applying, during a resistance measurement period, to one of the plurality of SMA actuator wires a resistance measurement current pulse, wherein the resistance measurement period corresponds to the respective active period of one of the plurality of SMA actuator wires.

20 Claims, 10 Drawing Sheets

(56) References Cited

U.S. PATENT DOCUMENTS

| | | | |
|---|---|---|---|
| 2006/0266031 A1 | 11/2006 | Kosaka et al. | |
| 2013/0300880 A1* | 11/2013 | Brown | H04N 23/68 |
| | | | 348/208.1 |
| 2013/0309880 A1* | 11/2013 | Chang | H01R 12/52 |
| | | | 439/78 |
| 2015/0049063 A1* | 2/2015 | Smith | G06F 3/0421 |
| | | | 345/175 |
| 2021/0190842 A1* | 6/2021 | Easton | G02B 7/02 |

* cited by examiner

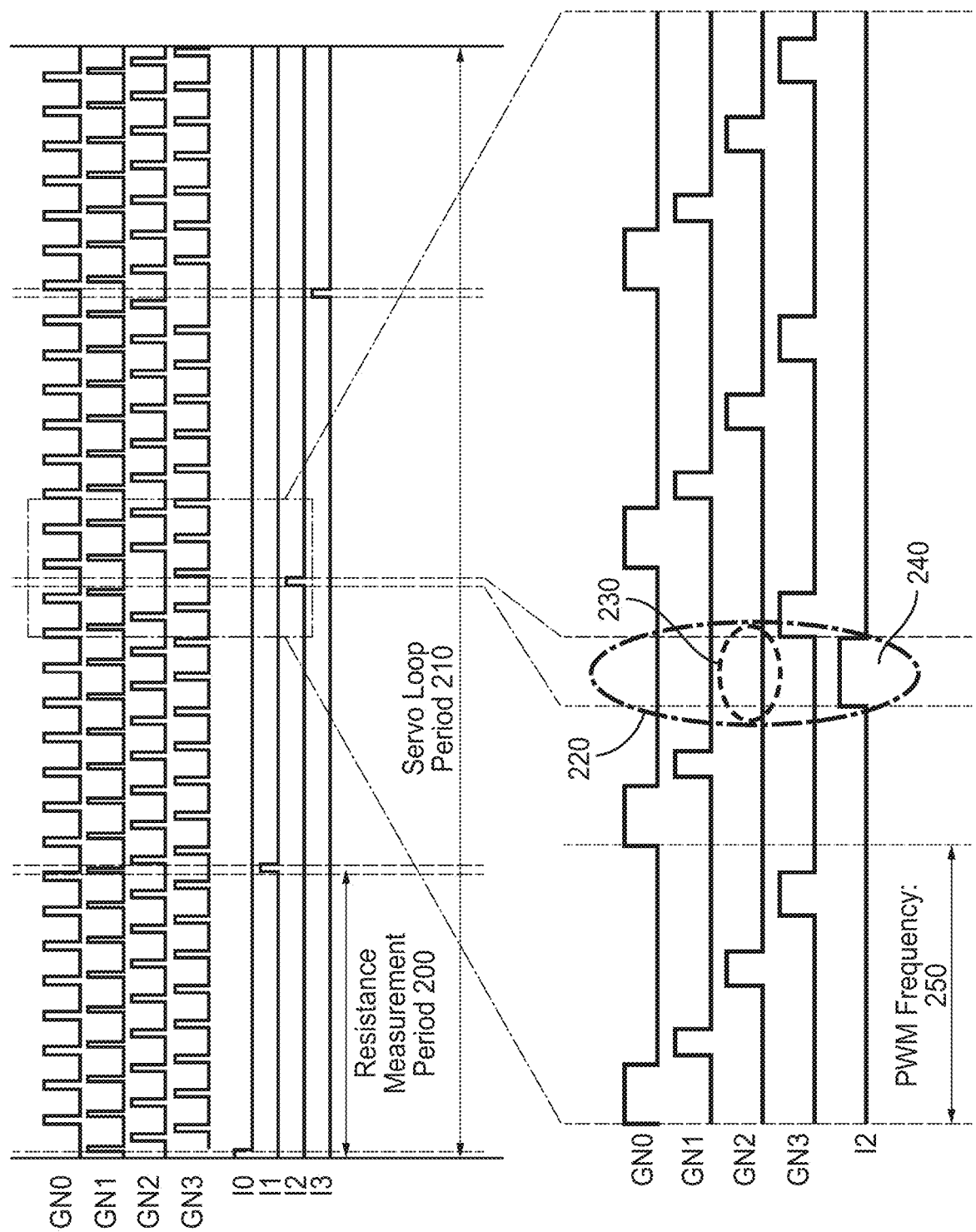

METHOD AND APPARATUS FOR CONTROLLING POWER DELIVERED TO AN SMA ACTUATOR

CROSS-REFERENCE TO RELATED APPLICATIONS

This application is a national stage application under 35 U.S.C. § 371 of International Application PCT/EP2019/083918, filed Dec. 5, 2019, which claims priority of GB Patent Application 1819864.8, filed Dec. 5, 2018. The disclosure of which are hereby incorporated by reference herein in their entireties.

The present application generally relates to apparatus and methods for controlling power delivered to an SMA actuator, forming part of an SMA actuator assembly.

FIG. 1 shows a plan view of an arrangement of shape memory alloy (SMA) actuator wires in an actuator 10. The actuator 10 may be incorporated into any apparatus comprising at least one component that requires moving during operation. For example, the actuator 10 may be used to move an optical element of an image capture device, but this is a non-limiting example. The actuator 10 may be incorporated into, for example, a smartphone, a mobile computing device, a laptop, a tablet computing device, a security system, a gaming system, an augmented reality system, an augmented reality device, a wearable device, a medical device, a drug delivery device, a drone (aerial, water, underwater, etc.), a vehicle (e.g. a car, an aircraft, a spacecraft, a submersible vessel, etc.), and an autonomous vehicle. It will be understood this is a non-exhaustive list of example devices into which the present actuator may be incorporated. In some cases, miniaturisation may be an important design criterion for the actuator.

The actuator 10 may, in use, comprise a component 2 that requires moving. The component 2 may be supported on a support structure 4 by a suspension system, in a manner allowing movement of the component 2 relative to the support structure 4 in two orthogonal directions each perpendicular to the primary axis P. In operation, the component 2 may be moved orthogonally to the primary axis P in two orthogonal directions, shown as X and Y.

The actuator 10 may, in embodiments, comprise four shape memory alloy (SMA) actuator wires 11 to 14 that are each connected to support structure 4 and to a movable component 15 that is used move the component 2 that requires moving. (It will be understood that this is just one example arrangement of an SMA actuator—the present techniques apply to an actuator having at least two SMA actuator wires). Each of the SMA actuator wires 11 to 14 is held in tension, thereby applying a force between the movable platform 15 and the support block 16 in a direction perpendicular to the primary axis P. In operation, the SMA actuator wires 11 to 14 move component 2 relative to the support block 16 in two orthogonal directions perpendicular to the primary axis P. The SMA actuator wires 11 to 14 each extend perpendicular to the primary axis P. In this actuator 10, the SMA actuator wires 11 to 14 may extend in a common plane, which may be advantageous in minimising the size of the actuator 10 along the primary axis P (e.g. the overall height or depth of the actuator 10).

Irrespective of whether the SMA actuator wires 11 to 14 are perpendicular to the primary axis P or inclined at a small angle to the plane perpendicular to the primary axis P, the actuator 10 may be made very compact, particularly in the direction along the primary axis P. The SMA actuator wires 11 to 14 may be, in some embodiments, very thin, typically of the order of 25 μm in diameter, to ensure rapid heating and cooling. The arrangement of SMA actuator wires 11 to 14 may not add to the footprint of the actuator 10 and may be made very thin in the direction along the primary axis P, since the SMA actuator wires 11 to 14 are laid essentially in a plane perpendicular to the primary axis P in which they remain in operation. The height along the primary axis may then depend on the thickness of the other components such as crimping members 17 and 18, and on the height necessary to allow manufacture. In practice, it has been found that the actuator arrangement of SMA actuator wires 11 to 14 may be manufactured to a height of less than 1 mm. In the example of a smartphone camera, the size of the SMA actuator wires 11 to 14 typically restricts the angle between the SMA actuator wires 11 to 14 and the plane perpendicular to the primary axis P to be less than 20 degrees, and more preferably less than 10 degrees.

The SMA actuator wires 11 to 14 are connected at one end to the movable platform 15 by respective crimping members 17 and at the other end to the support block 16 by crimping members 18. The crimping members 17 and 18 crimp the wire to hold it mechanically, optionally strengthened by the use of adhesive. The crimping members 17 and 18 also provide an electrical connection to the SMA actuator wires 11 to 14. However, any other suitable means for connecting the SMA actuator wires 11 to 14 may alternatively be used.

SMA material has the property that on heating it undergoes a solid-state phase change which causes the SMA material to contract. On heating of one of the SMA actuator wires 11 to 14, the stress therein increases and it contracts. This causes movement of the component 2. Conversely, on cooling of one of the SMA actuator wires 11 to 14 so that the stress therein decreases, it expands under the force from opposing ones of the SMA actuator wires 11 to 14. This allows the component 2 to move in the opposite direction.

As shown in FIG. 1, the SMA actuator wires 11 to 14 have an arrangement around the primary axis P as follows. Each of the SMA actuator wires 11 to 14 is arranged along one side of the component 2. Thus, the SMA actuator wires 11 to 14 are arranged in a loop at different angular positions around the primary axis P. Thus, the four SMA actuator wires 11 to 14 consist of a first pair of SMA actuator wires 11 and 13 arranged on opposite sides of the primary axis P and a second pair of SMA actuator wires 12 and 14 arranged on opposite sides of the primary axis P. The first pair of SMA actuator wires 11 and 13 are capable on selective driving to move the component 2 relative to the support structure 4 in a first direction in said plane, and the second pair of SMA actuator wires 12 and 14 are capable on selective driving to move the component 2 relative to the support structure 4 in a second direction in said plane transverse to the first direction. Movement in directions other than parallel to the SMA actuator wires 11 to 14 may be driven by a combination of actuation of these pairs of the SMA actuator wires 11 to 14 to provide a linear combination of movement in the transverse directions. Another way to view this movement is that simultaneous contraction of any pair of the SMA actuator wires 11 to 14 that are adjacent each other in the loop will drive movement of the component 2 in a direction bisecting those two of the SMA actuator wires 11 to 14 (diagonally in FIG. 1, as labelled by the arrows X and Y).

As a result, the SMA actuator wires 11 to 14 are capable of being selectively driven to move the component 2 relative to the support structure 4 to any position in a range of movement in two orthogonal directions perpendicular to the primary axis P. The magnitude of the range of movement depends on the geometry and the range of contraction of the SMA actuator wires 11 to 14 within their normal operating parameters.

The position of the component 2 relative to the support structure 4 perpendicular to the primary axis P is controlled by selectively varying the temperature of the SMA actuator wires 11 to 14. This is achieved by passing through SMA actuator wires 11 to 14 selective drive currents that provides resistive heating. Heating is provided directly by the drive current. Cooling is provided by reducing or ceasing the drive current to allow the component 2 to cool by conduction, convection and radiation to its surroundings.

In prior art systems employing SMA actuators, it is problematic to accurately measure SMA actuator wire resistance during PWM pulse delivery. Typically, the power delivery pulses are very short (<1 us) and the peak current is high (in the region of 200 mA).

Additionally, in the prior art, a series current sense resistor is required. To achieve good SMA control, the changes in wire resistance need to be measured with a resolution of a few milliohms and these measurements need to be independent of the power delivered to any of the wires in the system.

Embodiments of the present techniques seek to address shortcomings in the prior art, whether mentioned herein or not.

According to a first approach of the present techniques, there is provided a method of controlling power delivered to a shape memory alloy, SMA, actuator wire arrangement, wherein the arrangement comprises a plurality of SMA actuator wires, comprising the steps of: applying, at a PWM frequency, to each of the SMA actuator wires during respective active periods a succession of voltage pulses; applying, during a resistance measurement period, to one of the plurality of SMA actuator wires a resistance measurement current pulse, wherein the resistance measurement period corresponds to the respective active period of one of the plurality of SMA actuator wires.

The phrase "corresponds" in this case may mean "relates to". For example, the resistance measurement current pulse may be applied at the exact moment when the voltage pulse is applied or expected to be applied. Alternatively, the duration of the resistance measurement current pulse may extend beyond that of the active period of the SMA wires, or vice versa. E.g. the timing of resistance measurement current pulse and the active period of an SMA wire may not be identical but they should at least partially overlap so as to correspond with each other.

Optionally, during the applying, the method comprises suppressing or withholding one of the voltage pulses applied to the said one of the plurality of SMA actuator wires during the resistance measurement period, such that the resistance measurement current pulse is applied in absence of any voltage pulse.

For example, the step of suppressing one of the voltage pulses comprises withholding or cancelling the supply of said voltage pulse to the respective SMA actuator wire, at a time when the voltage pulse is expected or scheduled, to accommodate the resistance measurement current pulse.

By applying a known calibrated current pulse to the SMA actuator wire arrangement, a precise resistance measurement may be carried out without requiring the knowledge of the amplitude of the drive voltage pulses. The present invention is advantageous over prior art methods that utilise a sense resistor and voltage drive, which often require a well regulated power supply. For example, in such prior art methods, there may exist significant ripple and/or noise in the power rail which, will make precise resistance measurement difficult or impossible. Such problems in the prior art techniques may be mitigated by ratiometric measurement. However, they may require more complex circuitry to implement.

Advantageously, the present invention may measure the resistance with a lower current passing through the SMA actuator wire arrangement. Since power is proportional to the square of the current, the power consumption using the present technique during resistance measurement may be significantly reduced. Therefore advantageously, the present technique may improve SMA control at elevated ambient temperatures, where the power consumption.

Furthermore, by removing the sense resistor used in the prior art techniques, the system according to the present invention may be made more power efficient. For example, power may no longer dissipate to and being wasted in the sense resistor. It may also reduce the bill of material (BOM) cost and physical size for the system.

In an embodiment, a resistance measurement period is defined whereby in an nth resistance measurement period a voltage pulse applied to SMA actuator wire n is suppressed and the resistance measurement current pulse is applied to wire n instead, whereby n cycles through the values 0 to n, where n is equal to the number of SMA actuator wires.

In an embodiment, for a first given time all voltage pulses applied to all SMA actuator wires are suppressed and resistance measurement current pulses are applied sequentially to each wire of the plurality of SMA actuator wires.

In an embodiment, the first given time is a PWM period associated with the PWM frequency.

In an embodiment, a resistance measurement period is defined whereby in an nth resistance measurement period, all voltage pulses applied to all SMA actuator wires are suppressed and the resistance measurement current pulse is applied to wire n instead, whereby n cycles through the values 0 to n, where n is equal to the number of SMA actuator wires.

In an embodiment, for a second given time, a plurality of voltage pulses are suppressed on only one of the plurality of SMA actuator wires and during the second given time, a plurality of resistance measurement current pulses are applied sequentially to each of the plurality of SMA actuator wires.

In an embodiment, the second given time is n×the PWM period associated with the PWM frequency, where n is equal to the number of SMA actuator wires.

In an embodiment, a resistance measurement current pulse is applied to each of the plurality of SMA actuator wires per PWM period.

In an embodiment, the plurality of suppressed PWM pulses occur at a start of each PWM period and the resistance measurement current pulse is applied at the start of each PWM period.

Alternatively, during the applying, the method comprises synchronising the resistance measurement current pulse with the voltage pulse applied to the said one of the plurality of SMA actuator wires during the resistance measurement period, such that the resistance measurement current pulse is applied during the voltage pulse.

For example, the step of synchronising comprises applying the resistance measurement current pulse with the supply of said voltage pulse to the respective SMA actuator wire, at a time when the voltage pulse is expected or scheduled, to carry out resistance measurement thereat. Alternatively, an active period may be additionally provided for measuring the resistance of the SMA actuator wire.

In a PWM drive, a maximum current, and hence maximum power, may periodically be applied to the load with a duty cycle d %. In some cases, it may be necessary to deliver pulses of very short period to the load. This may make resistance measurement challenging, since the signal conditioning amplifier may need to settle very quickly. Typically, bandwidths of 20 MHz or greater may be required. Additionally, a slew of the power switch should be limited to minimise the amount of EMI interference created by the actuator and associated drivers. This may further increase the settling time of the measurement and hence making the resistance measurement even more challenging. Separating the resistance measurement task from the power delivery task, gives the following advantages: 1) Minimum Power Delivery. Resistance may be measured with a lower current, and since power is proportional to the square of the current, the power delivered during resistance measurement may be significantly reduced. This will improve SMA control at elevated ambient temperatures, where the is a requirement to deliver very small powers in some instances. 2) Efficiency and precise resistance measurement. Such method may combine the benefits of both PWM drive and current drive, thus providing a simpler and cheaper electronic solution. 3) The slew on PWM can be increased without effecting resistance measurement. Since the PWM power delivery pulse shape may no longer be critical to resistance measurement, significant slew can be added to the switching edges. As such, increasing slew may be a valuable tool in reducing electromagnetic interference from the actuator. 4) A series current sense resistor may not be required to measure resistance. This improves efficiency of power delivery and reduces the BOM cost and physical size for the system. 5) A higher PWM switching frequencies may be used. High frequency PWM may be limited by the need to have pulses of sufficient width to measure resistance.

In an embodiment, the energy supplied to the said one of the plurality of SMA actuator wires during the resistance measurement period is less than that being supplied thereto during active periods when a resistance measurement current pulse is not applied. More specifically, when resistance measurement is not carried out, the power supply to an SMA wire may significantly be higher during an active period to cause rapid temperature rise thus resulting in a prompt contraction in the SMA wire. During resistance measurement period however, the power supply to the SMA wire may be limited to minimise temperature rise, thus contraction, in the SMA wire.

In an embodiment, the resistance measurement current pulse comprises a predetermined current, wherein the same resistance measurement current is applied to all of the SMA actuator wires. For example, the predetermined current may be readily controlled at a known amplitude and may be significantly lower than a maximum current applied to the SMA wire during actuation of the actuator.

In an embodiment, the resistance measurement current pulse is applied by a source different to the source for applying the voltage pulse. For example, the resistance measurement current pulse may be applied from a dedicated power supply that readily supplies a current at a predetermined amplitude.

In an embodiment, the duration of the active period where a resistance measurement current pulse is applied is adjustable for providing sufficient time to carry out resistant measurement of the respective SMA actuator wire. For example, the duration for measuring resistance may be longer than that of a typical active period for actuating the SMA wire, thus the active period may be lengthened to accommodate the time required for measuring resistance. In some embodiments, the duration of a resistance measurement current pulse fits within a PWM period associated with the PWM frequency.

In an embodiment, an nth resistance measurement period a voltage pulse and the corresponding resistance measurement pulse are applied to SMA actuator wire n, whereby n cycles through the values 0 to n, where n is equal to the number of SMA actuator wires. This allows the resistance in each of the wires to be measured in turn. For example, resistance measurement may take place, in turn, on each of the SMA wires across different PWM periods, such that a single SMA wire may be measured during a single PWM period.

Alternatively, a single PWM period associated with the PWN frequency comprises all the n resistance measurement periods. In other words, resistance measurement may be carried out on each of the wires in a single PWM period. More specifically, the said single PWM period may be dedicated for resistance measurement and not for driving the SMA actuator.

Optionally, the resistance measurement current pulse is supplied to all the SMA actuator wires throughout the duration of the PWM period. That is, the resistance measurement current pulse a continues pulse lasting the duration of the PWN period. This may minimise the need for switching.

Alternatively, in an nth resistance measurement period corresponding to nth PWM period associated with the PWM frequency, voltage pulses applied to all but n SMA actuator wires are suppressed or withheld, and the resistance measurement current pulse is applied simultaneously during the application voltage pulse to wire n, whereby n cycles through the values 0 to n, where n is equal to the number of SMA actuator wires. For example, a dedicated active period is allocated within a PWN period for measuring the resistance of a SMA wire of interest.

Optionally, only one voltage pulse is applied to any one of the SMA actuator wires at any given time. Alternatively, voltage pulses may be applied to a plurality of SMA actuator wires, wherein a resistance measurement current pulse may be applied to one of the SMA actuator wires.

The phrase "voltage pulse" and "current pulse" may respectively mean a pulse of voltage and current being applied to the SMA wires. When a voltage pulse is applied, it refers to situation where the change in voltage is being used for power control. During a drive period, a voltage pulse may be accompanied by a maximum current applicable by the controller to encourage rapid contraction of the SMA wires. When a current pulse is applied, it refers to situation where the change in current is being used for power control. During a resistance measurement period, a current pulse with known amplitude may be applied to minimise temperature rise in the SMA wire.

According to a second approach of the present techniques, there is provided a shape memory alloy (SMA) actuator, comprising: a first part; a second part; a plurality of SMA actuator wires connecting the first part and the second part, the plurality of SMA actuator wires are configured to, on contraction, effect relative movement between the first part and the second part; and a controller configured to apply, at a PWM frequency, to each of the SMA actuator wires during respective active periods a succession of voltage pulses; and to apply, during a resistance measurement period, to one of the plurality of SMA actuator wires a resistance measurement current pulse, wherein the resistance measurement period corresponds to the respective active period of one of the plurality of SMA actuator wires.

Optionally, the SMA actuator further comprises: a first power source for applying the voltage pulse to each of the SMA actuator wires during the respective active periods; and a second power source for applying the resistance measurement current pulse to one the SMA actuator wires during the resistance measurement period; wherein the controller is configured to selectively activate the first power source and the second power source for applying respectively the voltage pulse and the current pulse.

Optionally, the second power source is a current source. For example, the current source is configured to apply a controlled, predetermined, current to the SMA wire. Thus, enables the resistance of an SMA wire to be measured accurately.

According to a third approach of the present techniques, a non-transitory data carrier is provided, carrying control code to implement the methods of the first approach.

According to a fourth approach of the present techniques, there is provided an arrangement for supplying power to an SMA, actuator wire arrangement operable to perform the method of the first approach.

The methods described herein may be used to control the power delivered to any SMA actuator wire arrangement. In particular, the SMA actuator wire arrangement may be used to control any type of device that comprises a static part and a moveable part which is moveable with respect to the static part. The SMA actuator wire arrangement/assembly may be, or may be provided in, any one of the following devices: a smartphone, a camera, a foldable smartphone, a foldable image capture device, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), a security system, a gaming system, a gaming accessory (e.g. controller, headset, a wearable controller, joystick, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, an autonomous vehicle (e.g. a driverless car), a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, and a near-field communication (NFC) device. It will be understood that this is a non-exhaustive list of example devices.

The methods described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

In a related approach of the present techniques, there is provided a non-transitory data carrier carrying processor control code to implement any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Implementations of the present techniques will now be described, by way of example only, with reference to the accompanying drawings, in which:

FIG. 2b shows a detailed schematic of the DAC component of the driver circuit of FIG. 2a;

FIG. 3 shows a timing diagram associated with a first embodiment of the present techniques;

Figure 1:
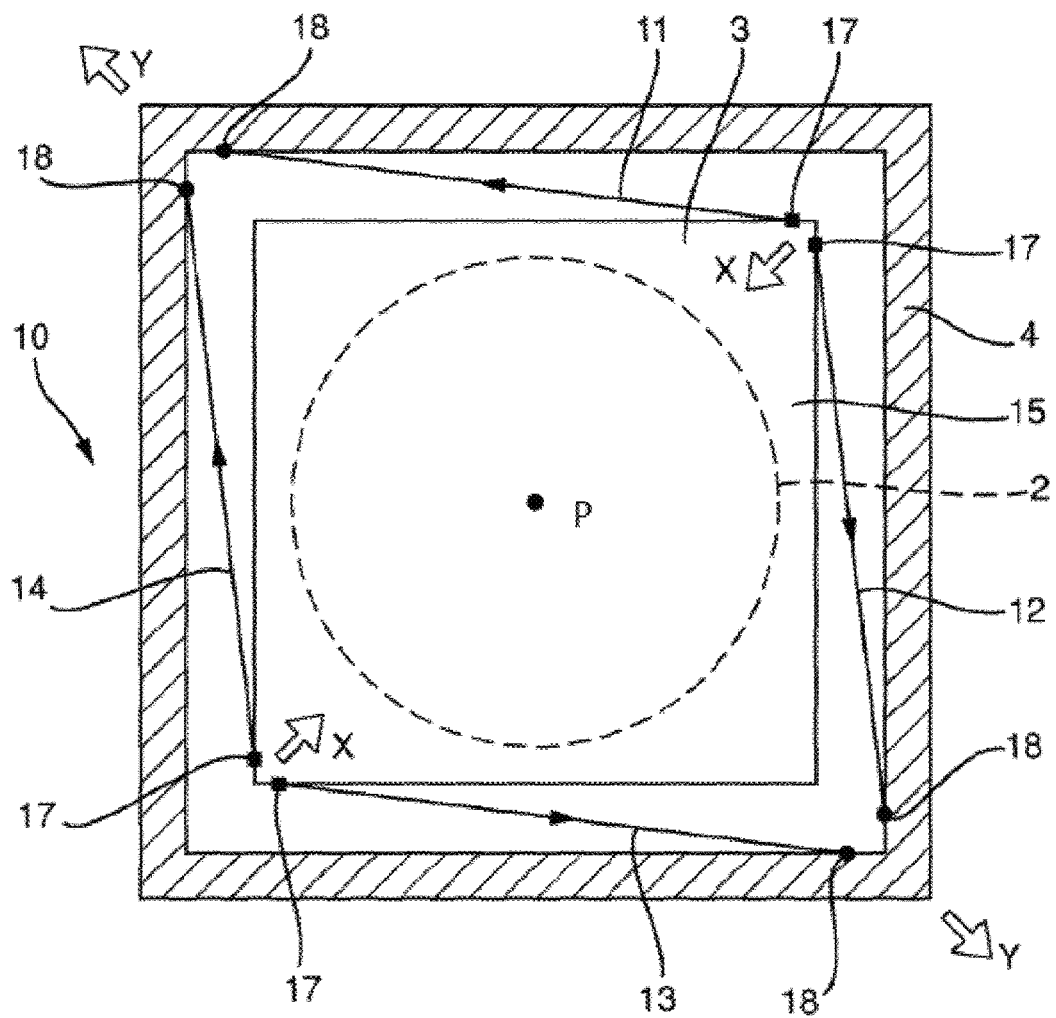
FIG. 1 shows a typical SMA actuator arrangement known in the art.
Figure 2A:
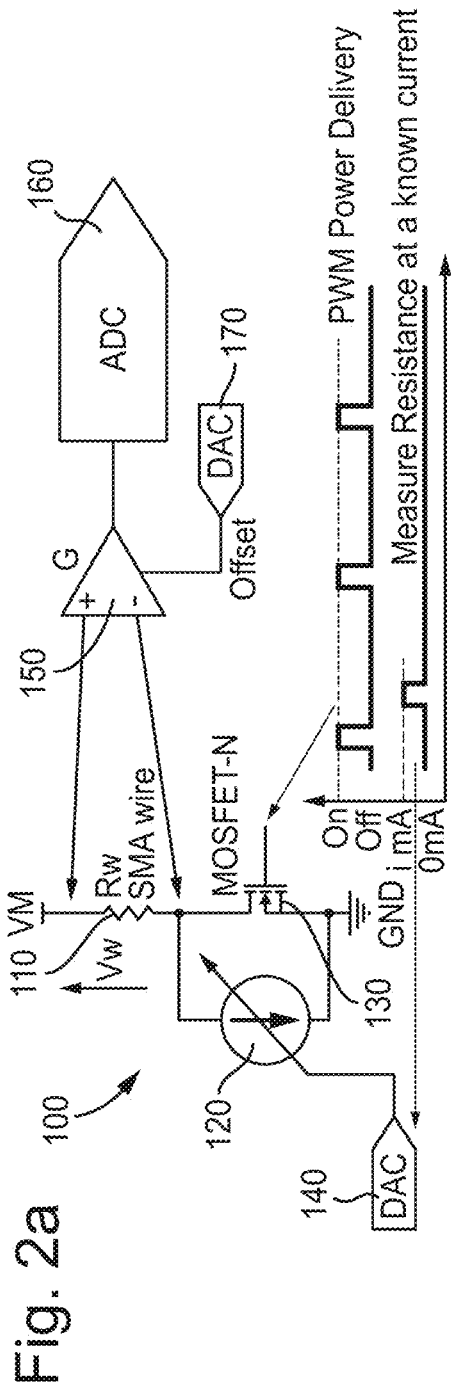
FIG. 2a shows a driver circuit for an SMA actuator wire according to an embodiment of the present techniques.

FIG. 2a shows a schematic of an example circuit 100, according to an embodiment of the techniques, for driving an SMA actuator wire 110 using a controlled current and in accordance with any of the drive schemes described in the following. In this arrangement, each SMA actuator wire 110 of an actuator is coupled between the positive supply rail Vm and the negative supply rail GND of circuit 100. Only a single wire 110 is shown here, for the sake of simplicity, but it will be understood that an actuator may comprise any number of SMA actuator wires, each of which may be coupled between the positive and negative supply rails. The circuit of FIG. 2a is repeated for as many SMA actuator wires as are present in a system. A typical system comprises 4, 8 or more such circuits. The system of FIG. 1 comprises 4 such SMA actuator wires.

In this arrangement, each SMA actuator wire 110 may be coupled to a current sink 120 that may sink a current of a predetermined value. The current sink 120 may be implemented by any conventional type of current sink having suitably high output impedance. The use of a current sink 120 sinking a current of a predetermined value may allow the voltage Vw across the SMA actuator wire 110 to be determined and the resistance of the SMA actuator wire 110 to be measured. A digital-to-analogue converter 140 may be used to control the current output or value of the current sink 120. Alternatively, to reduce system cost, the measurement current could be fixed to a known value suitable for the anticipated resistive loads to be measured.

The arrangement 100 comprises both a switch 130, here embodied as a Field Effect Transistor, FET, (specifically a Metal Oxide Semiconductor FET, MOSFET) and a current sink 120 operable to supply power to the SMA actuator wire 110. It should be noted that a current sink does not in itself supply current, but the skilled person will understand that it may be controlled in such a way as to control the current it sinks which, in effect, controls the current flowing through Rw 110. The skilled person will understand that a current source could equally provide the same function. Herein, any reference to a current sink or source supplying current or power is to be understood accordingly.

The reason for providing two possible sources for supplying power is that each one is associated with a different primary function. The switch 130 is primarily operable to provide pulses of power at maximum current to SMA actuator wire 110 in a controlled manner such that a determined level of heating can achieved, which leads, in turn, to the wire 110 assuming a defined length. By appropriate selection of voltage pulses applied to a plurality of wires, as shown for instance in FIG. 1 (wires 11-14), the movable component 15 can be caused to assume a particular position. This is an optimal way to drive the SMA actuator wires, from a power efficiency point of view.

The current sink 120, however, has a different function. It is operable to provide a known current to the SAM actuator wire 110. When the current sink 120 provides a known current at a level controlled by DAC 140, a measurement of the voltage across the SMA actuator wire 110 is made. A resistance measurement resolution of between 1 and 5 mcg (milliOhms) is typically required in order to afford the required level of control of the SMA actuator wires. The voltage measurement Vw is made by means of signal conditioning amplifier 150 with gain G and voltage offset VOFF. Its function it to amplify the small changes in voltage across the wire 110 so as to utilise the full range of the ADC.

Figure 2B:
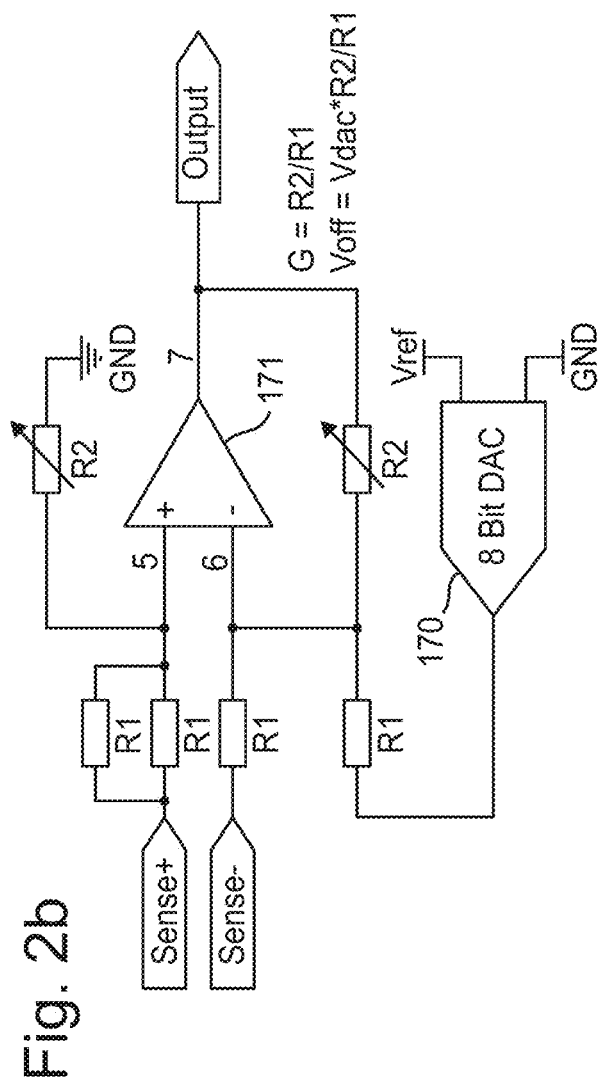

FIG. 2b shows a more detailed schematic of an example technique for providing the DAC functionality associated with DAC 170 of FIG. 2a. The output of differential amplifier 171 is applied to Amplifier 150, as shown in FIG. 2a.

The DAC 170 is provided to control the voltage offset of the signal conditioning amplifier 150. It is necessary to measure resistances in the range $R_{MAX}$ to $R_{MIN}$ Ohms, via use of a measurement current $I_{MEAS}$. The differential amplifier 171 receives an input in the range: $I_{MEAS} \cdot R_{MAX}$ to $I_{MEAS} \cdot R_{MIN}$ volts. It acts to condition this input voltage such that it exercises the full usable range of the ADC 160. If this range is considered to be 0V to $V_{REF}$, then the amplifier 150 Gain G is in the ratio of $V_{REF}$ to $I_{MEAS} \cdot (R_{MAX} - R_{MIN})$. i.e. $G = V_{REF}/(I_{MEAS} \cdot (R_{MAX} - R_{MIN}))$. In order to 'transfer' the lowest input voltage $I_{MEAS} \cdot R_{MIN}$ to 0V at the output, an offset VOFF of $-(I_{MEAS} \cdot R_{MIN})$ volts is required. This offset controls the minimum resistance which can be measured by the system, and the gain determines the range. Hence, DAC 170 is provided to ensure that suitable small resistance values can be measured.

The differential amplifier 171 is shown having a variable gain, controlled by R2 in the feedback loop. The gain need not be variable and can, in some cases, be fixed, as required.

In practice, only one ADC 160 and amplifier 150 is required for a system of multiple wires. An analogue multiplexer (or switch) is used to connect the input to amplifier 150 across the particular SMA actuator wire to be measured.

The analogue voltage measure is converted to a digital word in ADC 160. This digital value output from ADC 160 is fed to a controller (not shown) which is then able to determine the resistance of the wire and hence its length. This allows the controller to arrange an appropriate pattern of voltage pulses to be applied by switch 130 so that a desired length of SMA actuator wire can be attained.

It is typically easier to make an accurate resistance measurement when a known current is delivered to a load, such as wire 110. Resistance typically needs to be measured at the same rate at which an SMA controller servo loop operates. The servo loop takes, as inputs, a set of resistance readings and calculates a set of SMA actuator wire drive powers as its output. Hence, it is necessary to read the resistance of the SMA actuator wires at the same rate at which the servo loop operates. This is lower than the PWM switching frequency, typically 2 kHz to 5 kHz. It is also desirable to deliver as little power as possible to the SMA wire whilst measuring resistance. Typically, the minimum power supplied to the actuator wire equals the power required to make the resistance measurement. This minimum power requirement can become critical when the actuator is operating at high ambient temperatures.

FIG. 3 shows a timing diagram which relates to a mode of operation according to a first embodiment of the present techniques. This diagram relates to an SMA actuator assembly having 4 SMA actuator wires (wires 0, 1, 2 and 3). Voltage pulses from switch 130 are applied to the wires individually as depicted by the pulses labelled GB0, GN1, GN2 and GN3, which are the voltage pulses applied to the 4 SMA actuator wires respectively.

Also shown in FIG. 3 are the locations where current pulses I0, I1, I2 and I3 are supplied from current sink 120 to the 4 wires respectively.

FIG. 3 illustrates clearly how PWM pulses, supplied from switch 130, are interleaved with the current pulses from current sink 120. This interleaving allows the resistance of each wire 110 to be measured by means of the current pulses at a rate of approximately 2 to 4 KHz which matches the loop rate of the SMA servo process.

This arrangement also allows power to be delivered precisely to the wires 110 and avoids measuring resistance while the switch 130 is delivering high current to any of the wires.

This approach typically introduces a relatively small amount of energy at the resistance measurement rate, which can serve to minimise the possibility of audible noise being created by the actuator. In particular, noise at a frequency of 2.5 KHz can be problematic as the human ear is particularly sensitive to this frequency.

FIG. 3 shows that the voltage pulses GB0-GN3 are periodic in nature, but with each pulse varying in duration, depending on the power which needs to be applied to a particular wire at a particular time.

In order to measure the resistance of a given wire at a particular time, one voltage pulse is suppressed and a current pulse is instead introduced at the time when the voltage pulse would otherwise have been applied to the SMA actuator wire 110. This can be seen clearly in the magnified portion 220 of FIG. 3 which shows the position 230 where a voltage pulse is suppressed on wire 2, e.g. the supply of voltage pulse GN2 is withheld or cancelled at position 230. In its place, a current pulse 240 is introduced. All of the pulses on the other wires are unaffected, as are the other pulses on wire 2, apart from the single voltage pulse 230 which is suppressed to accommodate the current pulse 240.

Shown on FIG. 3 is a resistance measurement period 200 which shows the time between successive resistance measurement pulses. The period is measured between pulses on any of the wires. FIG. 3 shows four such periods 200, during which time one resistance measurement is made on each of the 4 SMA actuator wires in the system.

Also shown is the servo loop period which is the time in which a resistance measurement is made on each SMA actuator wire in the system. This equals four times the resistance measurement period in this case, since there are 4 SMA actuator wires.

The PWM frequency 250 is also illustrated. This is represented by the period between successive pulses on any one of the SMA actuator wires.

Figure 4:
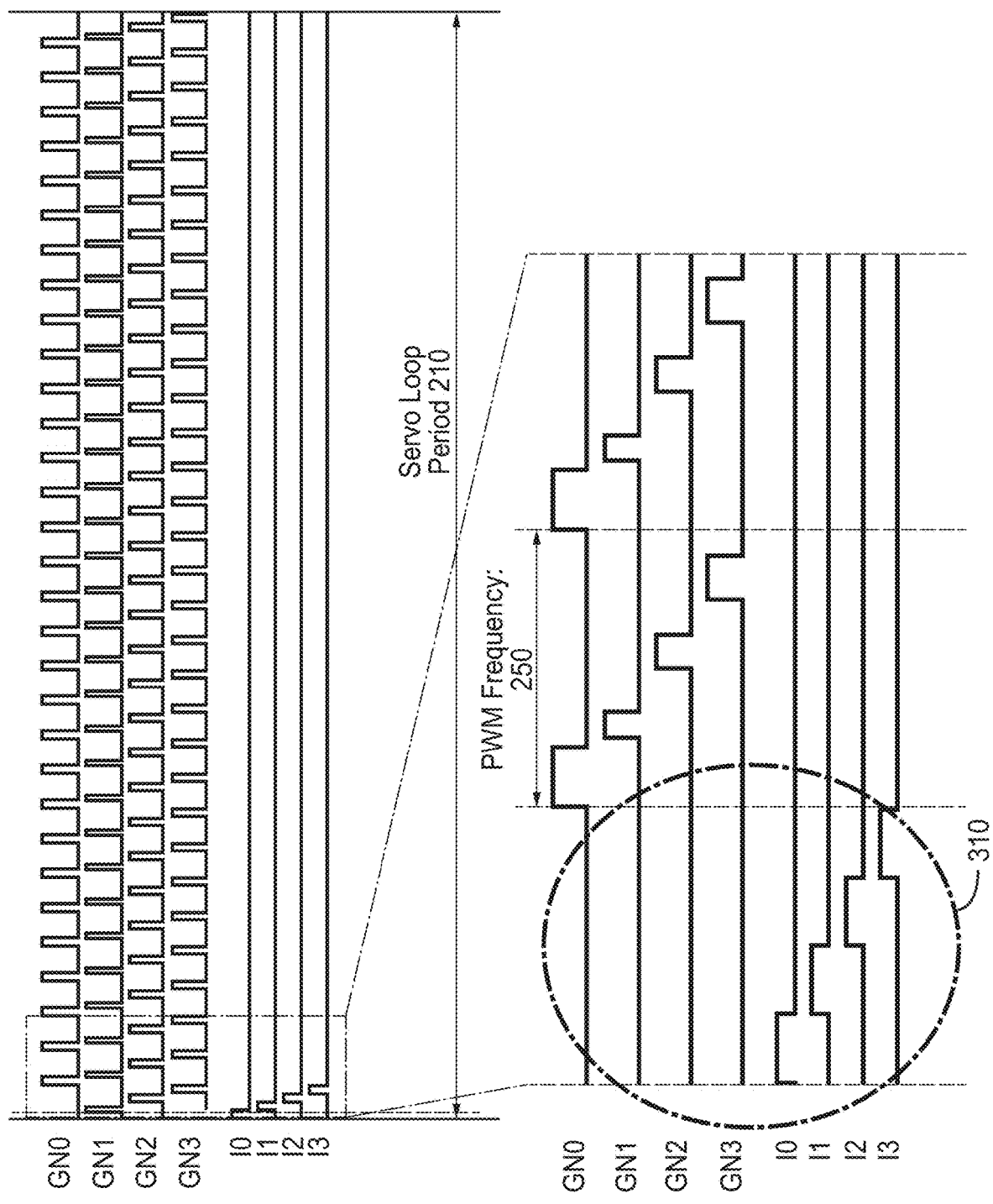
FIG. 4 shows a timing diagram associated with a second embodiment of the present techniques.

FIG. 4 shows a second embodiment of the present techniques. This differs from the embodiment illustrated in FIG. 3 in that all of the resistance measurement events are grouped together in a single PWM period. In the embodiment of FIG. 3, a single resistance measurement event occurs in each PWM period, with all resistance measurements therefore being spread across a servo loop period 210.

FIG. 4 shows that for one PWM period, illustrated by the region 310, there are no PWM voltage pulses on any of the SMA actuator wires (i.e. all 4 pulses—one on each wire—are suppressed). Instead, a series of current pulses I0-I3 are supplied by current sink 120 to each of the SMA actuator wires in succession. The order of the current pulses is herein shown as I0, followed by I1, followed by I2, followed by I3, but the order of application of the current pulses for resistance measurement is not significant.

System latency is a measure of the time required for the result of a measurement to have an effect on the operation of the system. In general, embodiments of the present techniques operate by following a sequence of tasks at the rate of the servo loop, namely: measure resistance of n wires; then execute servo loop and calculate wire powers for the next frame to move the actuator to the desired position; and then write new powers. It is desirable to minimise or at least reduce system latency such that there is minimal time between taking resistance measurements and action being taken on the basis of these measurements.

An advantage of this arrangement is that there is reduced system latency, but requires a higher specification ADC 160, since it is required to make conversions related to each current pulse in rapid succession. Of course, it may be possible to spread the current pulses out throughout the servo loop period 210 to alleviate this issue.

Figure 5:
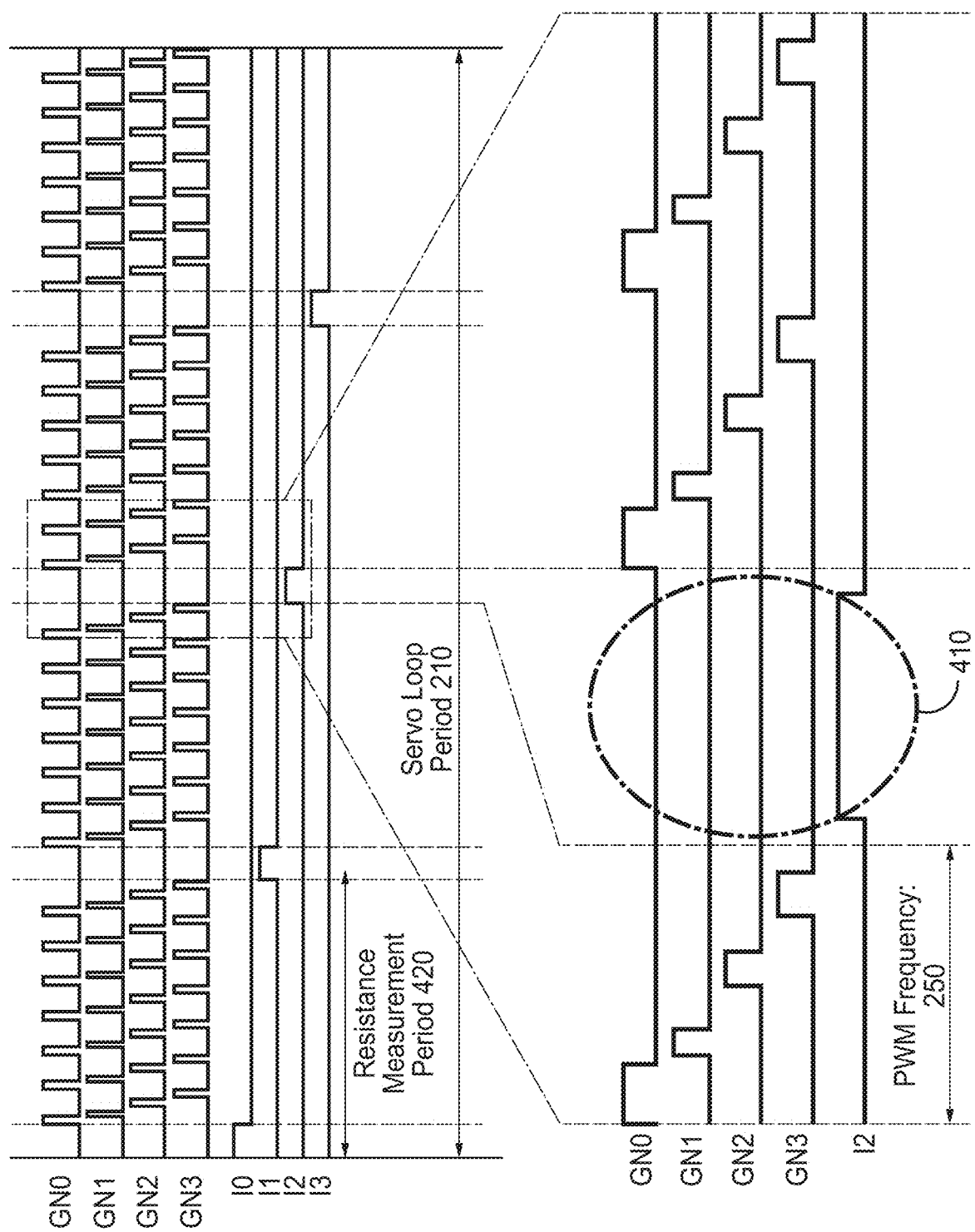
FIG. 5 shows a timing diagram associated with a third embodiment of the present techniques.

FIG. 5 shows a third embodiment of the present techniques. In this embodiment, an entire set of PWM voltage pulses are suppressed, as in the embodiment of FIG. 4, but rather than configure four resistance measurement events in that PWM period, only a single resistance measurement is configured for a single SMA actuator wire.

This can be seen more clearly in the region 410, where it can be seen clearly that there are no voltage pulses applied to any of the SMA actuator wires and, instead, a single relatively long duration current pulse is applied to a single SMA actuator wire, in this case, wire 2.

FIG. 5 shows a resistance measurement period 420, which is the time interval between resistance measurement events on the SMA actuator wires. In this embodiment, it can be seen that all voltage pulses are suppressed and a resistance measurement event is configured for wire 0. This is followed by a series of 7 sequential voltage pulses on wires 0 to 3, before a further suppression of all voltage pulses and a resistance measurement event is configured for wire 1. The same process continues with resistance measurement events for wires 2 and 3 before the entire cycle repeats.

This embodiment, with longer duration resistance measurement events, offers improved measurement of resistance. The longer duration resistance measurement events tend to introduce more energy into the SMA actuator wires at a frequency corresponding to the resistance measurement rate, which can introduce audible noise in the actuator.

Figure 6:
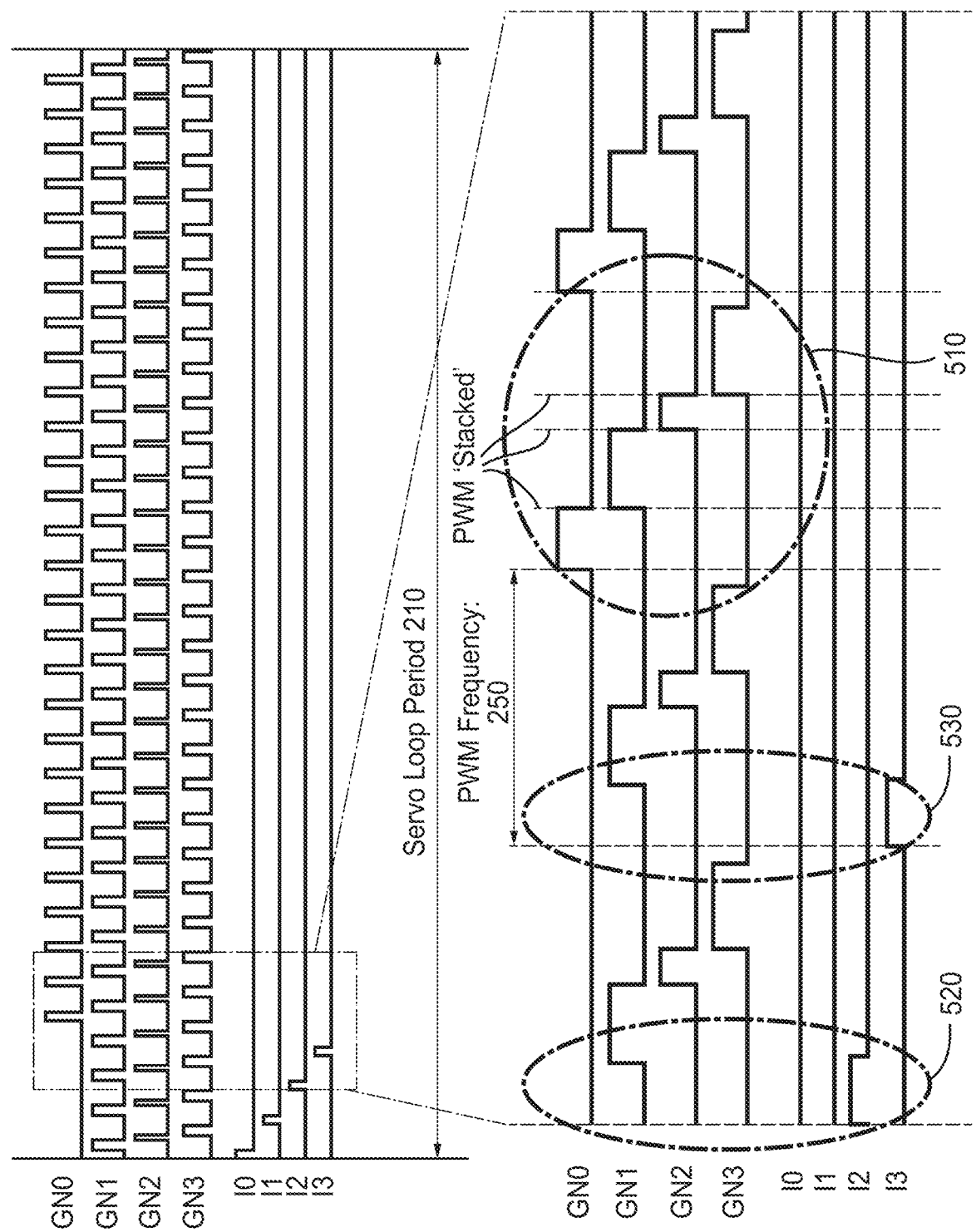
FIG. 6 shows a timing diagram associated with a fourth embodiment of the present techniques.

FIG. 6 illustrates a fourth embodiment of the present techniques. This embodiment deals with the case where successive voltage pulses on respective SMA actuator wires are 'stacked'. In this context, 'stacked' means that a PWM voltage pulse on one wire is turned off coincidentally with a PWM voltage pulse being turned on another wire. This can facilitate more power to be delivered to the SMA actuator wires in a given PWM period.

In this configuration, the PWM pulses are not uniformly distributed within the PWM period. This can be seen in FIG. 6 in region 510 where the stacking of the pulses can be seen clearly i.e. they are not evenly distributed and the turning off of one pulse coincides with the turning on of the next pulse on the next wire.

This process of stacking can introduce difficulties with the process of resistance measurement, particularly with regard to the timing thereof. In particular, it is not typically possible to simply replace a voltage pulse with a current measurement pulse, since a given PWM voltage pulse may be too short to allow a reliable current measurement to take place. It is, further, undesirable to adjust the stacking process to facilitate current measurement since this can introduce low frequency energy into the system which can produce audible noise from the actuator.

Therefore, in order to facilitate resistance measurement events in the case of stacked PWM voltage pulses, PWM voltage pulses on a single wire are suppressed while resistance measurement current pulses are supplied to each of the SMA actuator wires in sequence.

This can be seen in the upper part of FIG. 6 where it can be seen that there are no PWM voltage pulses applied to wire 0 at the start of the servo loop period 210. During this time, successive current pulses for resistance measurement are applied to wires 0 to 3 in successive resistance measurement slots which coincide with the PWM period 250.

In order to ensure that there is sufficient time for the current measurement pulse to yield a reliable resistance measurement, the start time of the PWM pulse on wire 1 (GN1) is delayed until the end of the current measurement pulse. This can be seen in regions 520 and 530 of FIG. 6, which show, respectively current pulses on wires 2 and 3 and how the voltage pulse applied to wire 1 follows after the end of the current pulse in each case.

The timing of the voltage pulse on wire 1 i.e. the delay from the start of the PWM period is replicated even in cases when current measurement is not occurring. It is generally desirable to maintain the same phase for the PWM voltage pulses throughout the entire power delivery frame, since to do otherwise runs the risk of introducing energy at audio frequencies which can generate audible noise. However, in some circumstances, it may be desirable, to alter the timing for wire 1 such that the rising edge of the voltage pulse on wire 1 coincides with the falling edge of wire 0. This represents a trade off between maximising deliverable power and minimising the risk of audible noise being generated.

Figure 7:
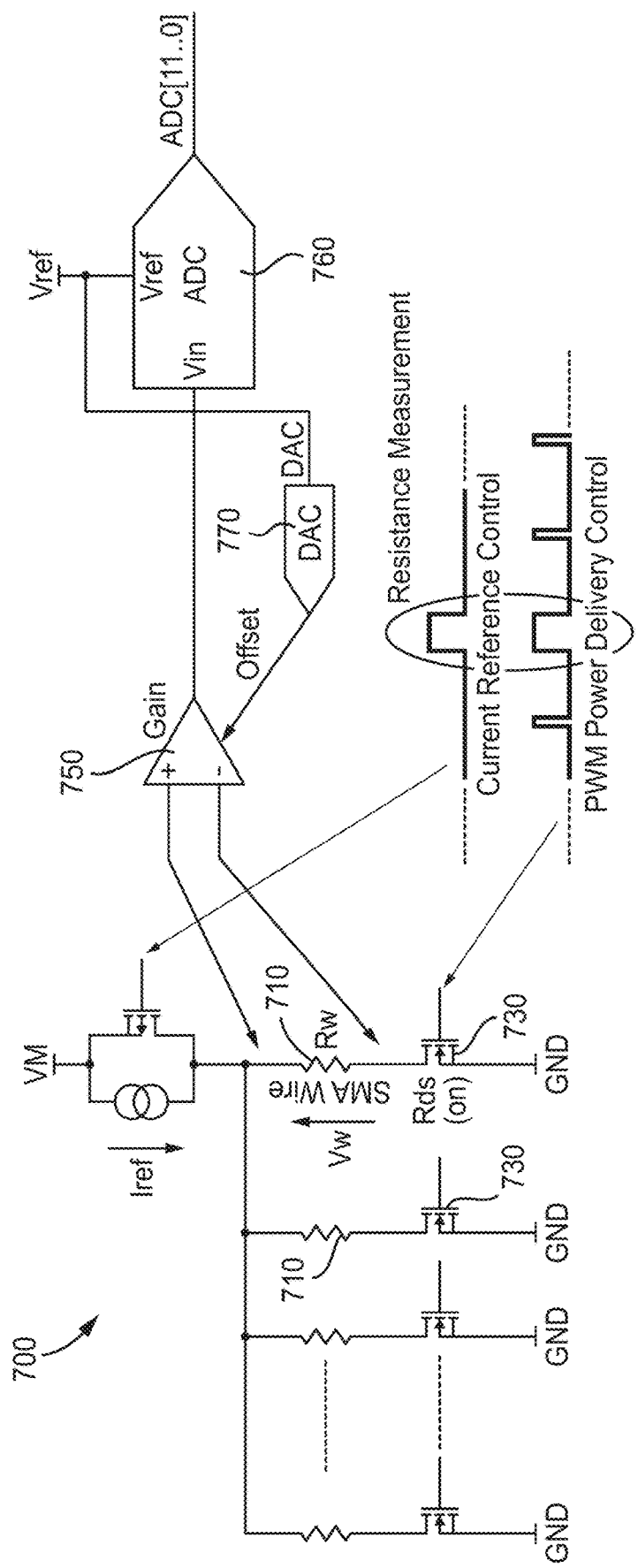
FIG. 7 shows a driver circuit for a plurality of SMA actuator wire according to another embodiment of the present techniques.

FIG. 7 shows a schematic of a circuit 700, according to another embodiment of the techniques. The circuit is configured to drive a plurality of SMA actuator wires 710 using a controlled current and in accordance with any of the drive schemes described in FIGS. 8, 9 and 10. A dedicated low side transistor switch 730, e.g., shown as N channel mosfet as shown in FIG. 7, is provided for each of the wires, so as to sequentially activate the wires in response to PWM modulation. For example, a 4 wires actuator comprises a driver circuit having four low side drivers 730 and one high side drivers and current source. Generally, the phrase low side means the side of SMA wire closest the GND and high side means the side of SMA wire opposite to the low side.

The circuit 700 utilises two mechanisms to drive power into the SMA wire from the high side. That is, 1) a current reference is used to source a known precise current Iref to the load, the current reference being applied to the SMA wire 710 during resistance measurement, and 2) the current source is bypassed by a transistor switch to deliver maximum power possible to the load during an active period or, the current source could be forced into saturation to deliver the maximum possible current possible, in order to cause a rapid temperature rise and therefore a prompt contraction in the SMA wire 710.

A resistance measurement resolution of between 1 mΩ and 5 mΩ is required for precise control of SMA actuators. Hence, a signal conditioning amplifier 750 with gain voltage G and voltage offset VOFF is required to amplify the small changes in voltage across the wire to utilise the full range of the ADC 760. Only one ADC 760 is required for a system of multiple SMA wires 760. An analogue multiplexer (switch) would be used to connect the amplifier input across the wire to be measured.

It is easier to make an accurate resistance measurement when a known current is delivered to the load. Resistance needs to be measured at the same rate that the SMA controller servo loop operates. This is lower than the PWM switching frequency, typically 2 kHz to 5 kHz. It is desirable to deliver as little power as possible to the SMA wire whilst measuring resistance. Therefore, the minimum power one must drive to the actuator equals the power required to make the resistance measurement. This minimum power requirement can become critical when the actuator is operating at high ambient temperatures.

To enable power supply and resistance measurement across multiple wires within an actuator, the timing and interleaving of the PWM pulses and resistance measurement current pulses is critical. There are several key driver requirements such as: 1) Measure the resistance of each wire precisely at a rate of approximately 2 kHz TO 4 kHz. This is the loop rate of the SMA servo process. 2)

Deliver power precisely to the wires. 3) Minimise any significant energy in the wire drive current in the audible frequency range.

Figure 8:
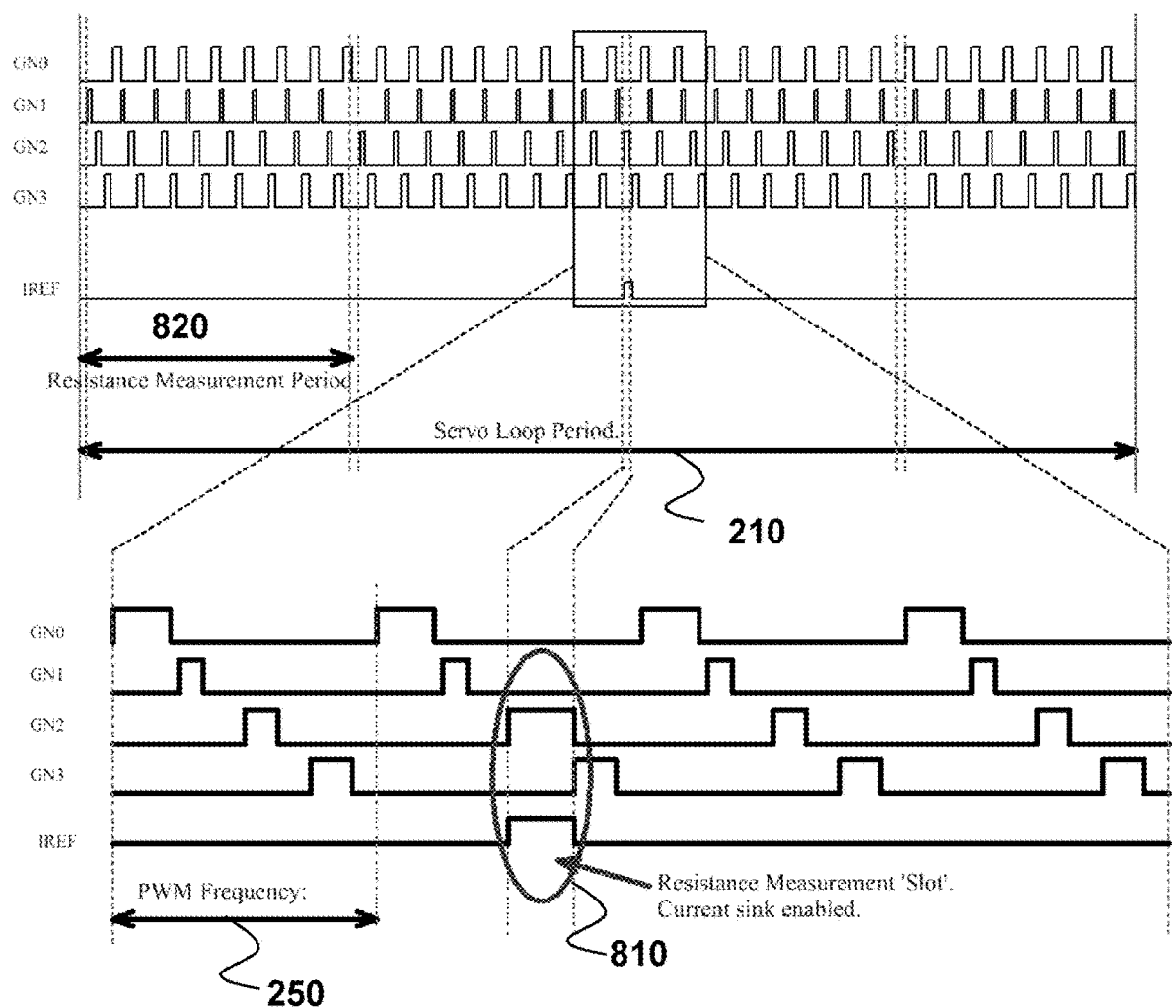
FIG. 8 shows a timing diagram associated with a fifth embodiment of the present techniques.

FIG. 8 shows a first timing configuration for 4 wire actuator control. GNx are the enable signals to the PWM power switches 730. For example, FIG. 8 relates to an SMA actuator assembly having 4 SMA actuator wires (wires 0, 1, 2 and 3). Voltage pulses from switch 730 are applied to the wires individually as depicted by the pulses labelled GB0, GN1, GN2 and GN3. Iref is the current source that enables resistance measurement current pulse to be applied at the wires. This scheme can easily be extended to drive more wires by adding additional PWM drivers, for example an actuator having eight independently controlled SMA wires.

FIG. 8 illustrates clearly, at region 810, how current pulses are applied during the application of a voltage pulse. In this case, a single PWM power delivery pulse is replaced by a current measurement event 820. E.g. a voltage pulse still applied to the SMA wire but the power supplied thereto is limited during current measurement event. This approach is expected to introduce less energy at the resistance measurement rate which may mitigate against audible noise. But the resistance measurement may need to be made over a short time period close to neighbouring power delivery pulses. As shown in the FIG. 8, the duration, or pulse width, of the voltage and current pulses during current measurement 810 is shown lengthier than adjacent power delivery pulse (or PWM pulse), in order to allow sufficient time for resistance measurement.

Figure 9:
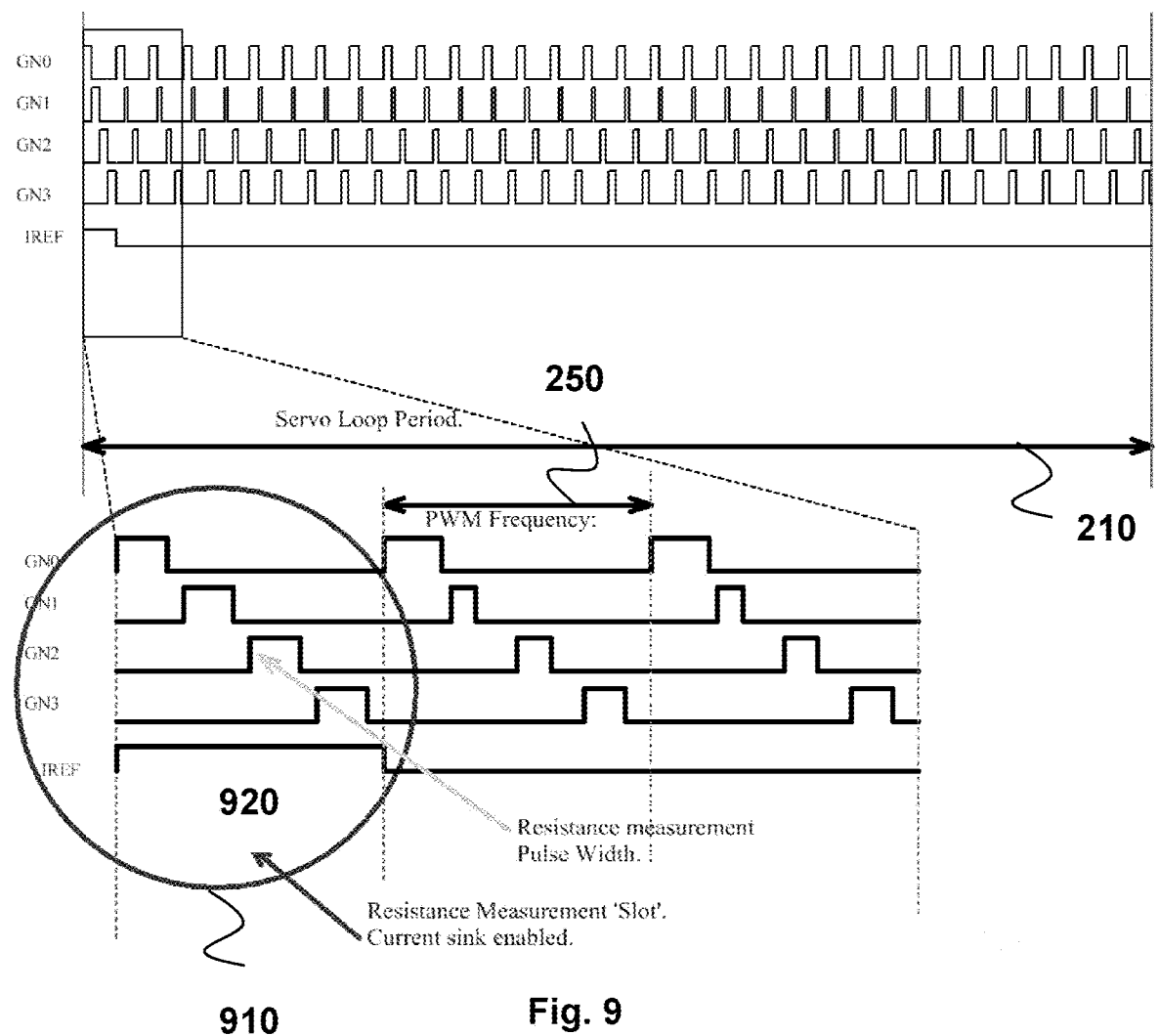
FIG. 9 shows a timing diagram associated with a sixth embodiment of the present techniques.

FIG. 9 shows an alternative timing configuration for the same 4 wire actuator control of FIG. 8. In this embodiment the resistance measurement period 920 is adjusted to bunch the resistance measurement events 910 closer together. As illustrated, in some cases all resistance measurements could be made during the first PWM period. Such arrangement has the advantage of reducing system latency. However, the ADC may be required to make multiple conversions in quick succession.

Figure 10:
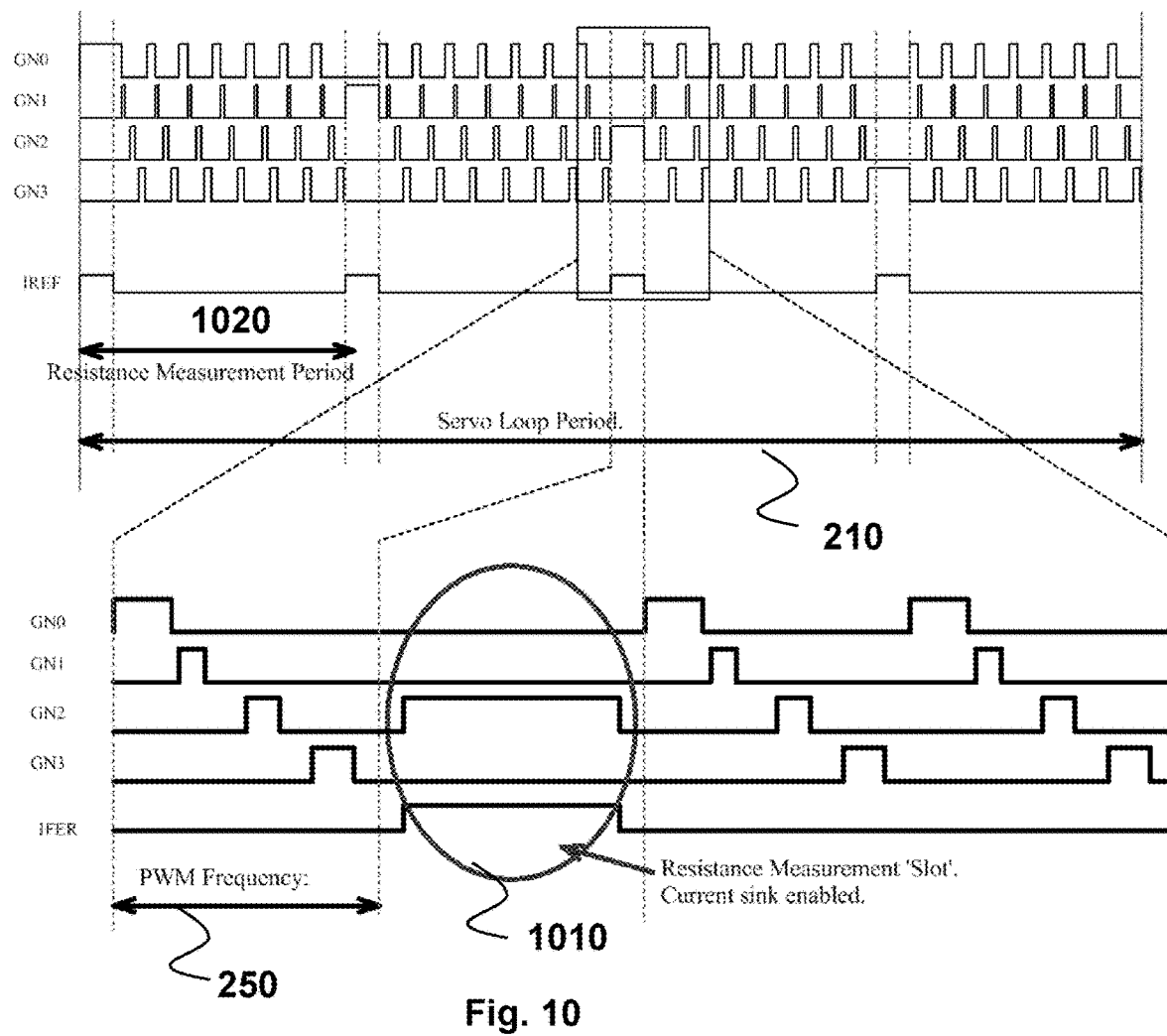
FIG. 10 shows a timing diagram associated with a seventh embodiment of the present techniques.

FIG. 10 shows yet another alternative timing configuration for measuring resistance. In this case the whole set of PWM power delivery pulses is suppressed and replaced by a long resistance measurement event 1020, as highlighted in region 1010. This approach should improve resistance measurement precision, although it may introduce more energy at the resistance measurement rate.

In the foregoing, the configurations of the various embodiments have been described in terms of suppressing one or more voltage pulses in order to insert one or more current pulses in the time that would otherwise have been occupied by the one or more voltage pulses. Of course, the use of the word "suppress" is conceptual in the sense that it assists in understanding how the relative timing of the voltage and current pulses is defined. It is not to be taken as requiring any physical form of suppression in the sense that a voltage pulse is created and somehow dissipated. Rather, it should be interpreted simply as the absence of a voltage pulses where one would otherwise be expected.

The timing of the voltage pulses and current pulses is under the control of a controller (not shown) and by suitable programming or configuring of the controller, an appropriate pattern of voltage and current pulses can be created.

In the foregoing, reference has been made to a 4-wire SMA actuator assembly, but it will be appreciated that this is exemplary only and in practice, any number of wires can be driven by appropriate adaptation of the system.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

According to further embodiments of the present invention, there is provided:

C1. A method of controlling power delivered to a shape memory alloy, SMA, actuator wire arrangement, wherein the arrangement comprises a plurality of SMA actuator wires, comprising: the steps of:
applying, at a PWM frequency, to each of the SMA actuator wires a succession of voltage pulses, whereby only one voltage pulse is applied to any one of the SMA actuator wires at any given time;
suppressing one of the voltage pulses applied to one wire of the SMA actuator wires and applying to one of the plurality of SMA actuator wires, a resistance measurement current pulse instead.

C2. The method of C1 wherein a resistance measurement period is defined whereby in an nth resistance measurement period a voltage pulse applied to SMA actuator wire n is suppressed and the resistance measurement current pulse is applied to wire n instead, whereby n cycles through the values 0 to n, where n is equal to the number of SMA actuator wires.

C3. The method of C1 wherein for a first given time all voltage pulses applied to all SMA actuator wires are suppressed and resistance measurement current pulses are applied sequentially to each wire of the plurality of SMA actuator wires.

C4. The method of C3 wherein the first given time is a PWM period associated with the PWM frequency.

C5. The method of C1 wherein a resistance measurement period is defined whereby in an nth resistance measurement period, all voltage pulses applied to all SMA actuator wires are suppressed and the resistance measurement current pulse is applied to wire n instead, whereby n cycles through the values 0 to n, where n is equal to the number of SMA actuator wires.

C6. The method of C1 wherein for a second given time, a plurality of voltage pulses are suppressed on only one of the plurality of SMA actuator wires and during the second given time, a plurality of resistance measurement current pulses are applied sequentially to each of the plurality of SMA actuator wires.

C7. The method of C6 wherein the second given time is n×the PWM period associated with the PWM frequency, where n is equal to the number of SMA actuator wires.

C8. The method of C7 wherein a resistance measurement current pulse is applied to each of the plurality of SMA actuator wires per PWM period.

C9. The method of C8 wherein the plurality of suppressed PWM pulses occur at a start of each PWM period and the resistance measurement current pulse is applied at the start of each PWM period.

C10. The method of any one of C1 to C9, wherein the step of suppressing one of the voltage pulses comprises withholding or cancelling the supply of said voltage pulse to the respective SMA actuator wire to accommodate the resistance measurement current pulse.

C11. A non-transitory data carrier carrying control code to implement the methods of any one of C1 to C9.

C12. An arrangement for supplying power to an SMA, actuator wire arrangement operable to perform the method of any of C1 to C10.

The invention claimed is:

1. A method of controlling power delivered to a shape memory alloy, SMA, actuator wire arrangement, wherein the arrangement comprises a plurality of SMA actuator wires, comprising:
applying, at a PWM frequency, to each of the SMA actuator wires during respective active periods a succession of voltage pulses; and
applying, during a resistance measurement period, to one of the plurality of SMA actuator wires a resistance measurement current pulse, wherein the resistance measurement period corresponds to the respective active period of one of the plurality of SMA actuator wires.

2. The method of claim 1, wherein during the applying, the method comprises suppressing or withholding one of the voltage pulses applied to the said one of the plurality of SMA actuator wires during the resistance measurement period, such that the resistance measurement current pulse is applied in absence of any voltage pulse.

3. The method of claim 2, wherein the resistance measurement period is defined whereby in an nth resistance measurement period a voltage pulse applied to SMA actuator wire n is suppressed and the resistance measurement current pulse is applied to wire n instead, whereby n cycles through the values 0 to m−1, where m is equal to the number of SMA actuator wires.

4. The method of claim 2, wherein for a first given time all voltage pulses applied to all SMA actuator wires are suppressed or withheld and resistance measurement current pulses are applied sequentially to each wire of the plurality of SMA actuator wires, wherein the first given time is a PWM period associated with the PWM frequency.

5. The method of claim 2, wherein a resistance measurement period is defined whereby in an nth resistance measurement period, all voltage pulses applied to all SMA actuator wires are suppressed and the resistance measurement current pulse is applied to wire n instead, whereby n cycles through the values 0 to m−1, where m is equal to the number of SMA actuator wires.

6. The method of claim 2, wherein for a second given time, a plurality of voltage pulses are suppressed on only one of the plurality of SMA actuator wires and during the second given time, a plurality of resistance measurement current pulses are applied sequentially to each of the plurality of SMA actuator wires, wherein the second given time is n×the PWM period associated with the PWM frequency, where n is equal to the number of SMA actuator wires.

7. The method of claim 6, wherein a resistance measurement current pulse is applied to each of the plurality of SMA actuator wires per PWM period.

8. The method of claim 1, wherein during the applying, the method comprises synchronising the resistance measurement current pulse with the voltage pulse applied to the said one of the plurality of SMA actuator wires during the resistance measurement period, such that the resistance measurement current pulse is applied during the voltage pulse.

9. The method of claim 8, wherein the energy supplied to the said one of the plurality of SMA actuator wires during the resistance measurement period is less than that being supplied thereto during active periods when a resistance measurement current pulse is not applied.

10. The method of claim 8, wherein the resistance measurement current pulse comprises a predetermined current, wherein the same resistance measurement current is applied to all of the SMA actuator wires.

11. The method of claim 8, wherein the resistance measurement current pulse is applied by a source different to the source for applying the voltage pulse.

12. The method of claim 8, wherein the duration of the active period where a resistance measurement current pulse is applied is adjustable for providing sufficient time to carry out resistant measurement of the respective SMA actuator wire.

13. The method of claim 8, whereby in an nth resistance measurement period a voltage pulse and the corresponding resistance measurement pulse are applied to SMA actuator wire n, whereby n cycles through the values 0 to m−1, where m is equal to the number of SMA actuator wires.

14. The method of claim 1, wherein only one voltage pulse is applied to any one of the SMA actuator wires at any given time.

15. A shape memory alloy (SMA) actuator, comprising:
a first part;
a second part;
a plurality of SMA actuator wires connecting the first part and the second part, the plurality of SMA actuator wires are configured to, on contraction, effect relative movement between the first part and the second part; and
a controller configured to apply, at a PWM frequency, to each of the SMA actuator wires during respective active periods a succession of voltage pulses; and to apply, during a resistance measurement period, to one of the plurality of SMA actuator wires a resistance measurement current pulse, wherein the resistance measurement period corresponds to the respective active period of one of the plurality of SMA actuator wires.

16. The SMA actuator of claim 15, further comprises:
a first power source for applying the voltage pulse to each of the SMA actuator wires during the respective active periods; and
a second power source for applying the resistance measurement current pulse to one the SMA actuator wires during the resistance measurement period;
wherein the controller is configured to selectively activate the first power source and the second power source for applying respectively the voltage pulse and the current pulse.

17. The SMA actuator of claim 16, wherein the second power source is a current source.

18. A non-transitory data carrier carrying control code to implement the method of claim 1.

19. An arrangement for supplying power to an SMA, actuator wire arrangement operable to perform the method of claim 1.

20. A method of controlling power delivered to a shape memory alloy, SMA, actuator wire arrangement, wherein the arrangement comprises a plurality of SMA actuator wires, comprising: the steps of:
applying, at a PWM frequency, to each of the SMA actuator wires a succession of voltage pulses, whereby only one voltage pulse is applied to any one of the SMA actuator wires at any given time; and
suppressing one of the voltage pulses applied to one wire of the SMA actuator wires and applying to one of the plurality of SMA actuator wires, a resistance measurement current pulse instead.

* * * * *